United States Patent [19]

Johnson

[11] 4,439,944
[45] Apr. 3, 1984

[54] FISHING ROD CASTING DEVICE FOR A DISABLED PERSON

[76] Inventor: Van W. Johnson, Rte. 1, Box 86, Leoma, Tenn. 38468

[21] Appl. No.: 320,928

[22] Filed: Nov. 13, 1981

[51] Int. Cl.³ .............................................. A01K 91/02
[52] U.S. Cl. ....................................................... 43/19
[58] Field of Search .......................... 43/19, 19.2, 21.2

[56] References Cited
U.S. PATENT DOCUMENTS

| | | | |
|---|---|---|---|
| 1,140,608 | 5/1915 | Phillips | 43/19 |
| 2,765,568 | 10/1956 | Kozar | 43/19 |
| 3,436,858 | 4/1969 | Shaffer | 43/19 |
| 3,525,174 | 8/1970 | Worsham | 43/19 |
| 3,559,328 | 2/1971 | Lesher | 43/19 |

Primary Examiner—Nicholas P. Godici
Assistant Examiner—Kurt Rowan
Attorney, Agent, or Firm—T. Eugene Burts

[57] ABSTRACT

A fishing rod casting device for a disabled person is provided, comprising a base for attachment to a wheelchair with an adjustable holder for a reel and a casting rod member pivotally connected to said base. Calibratable biasing means are provided on the holder pivot housing to accommodate the strength of the operator in cocking and releasing the casting device, a support device is provided, for attachment to the usable body member of the operator, having an operating lever adapted to engage a cocking and releasing ring on the holder housing, to cock and release the same for casting. The same operating lever is used to activate the reel to draw in the catch.

10 Claims, 12 Drawing Figures

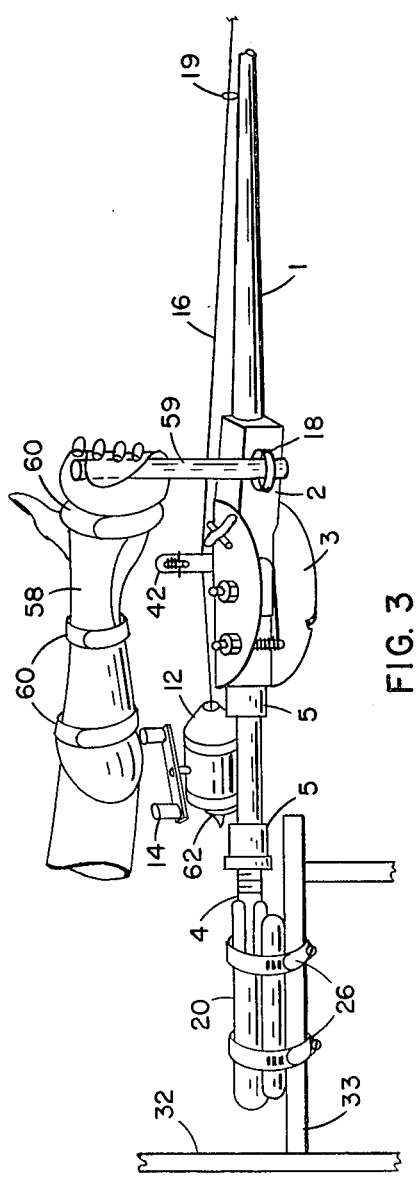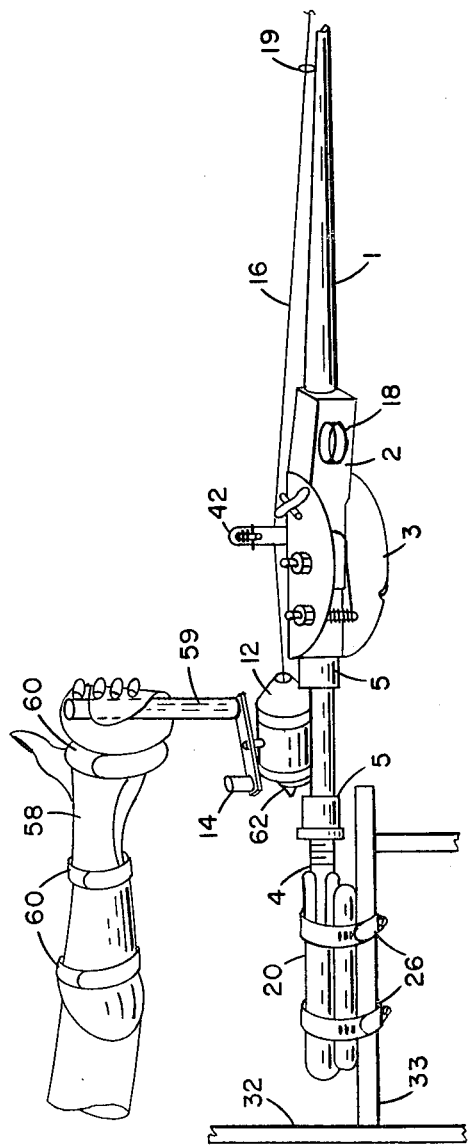

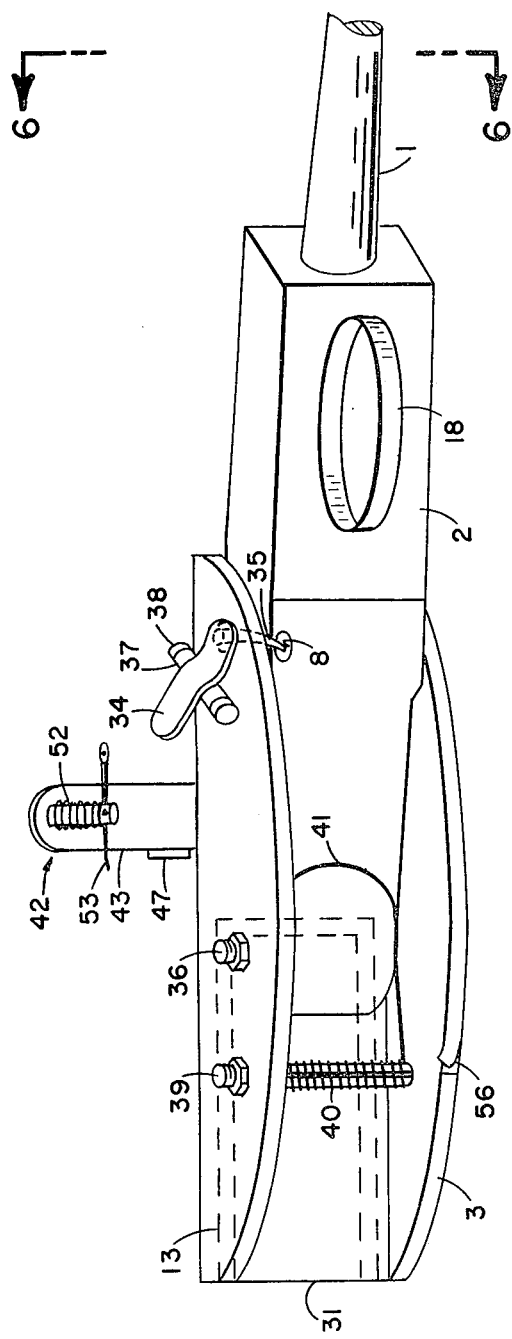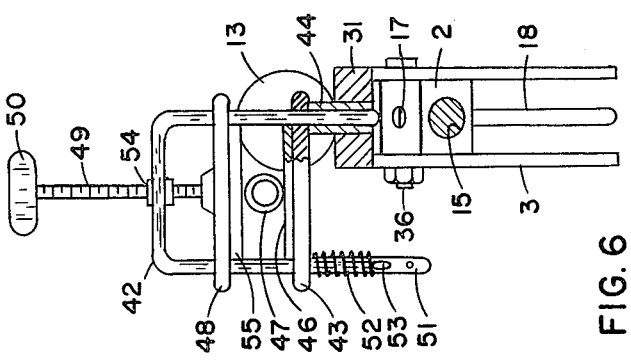

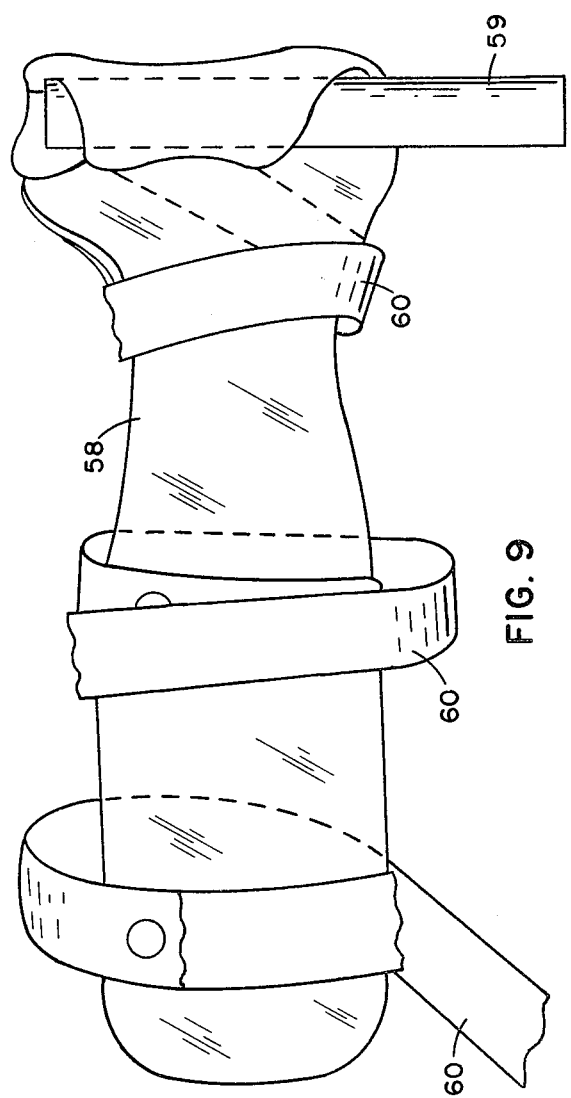
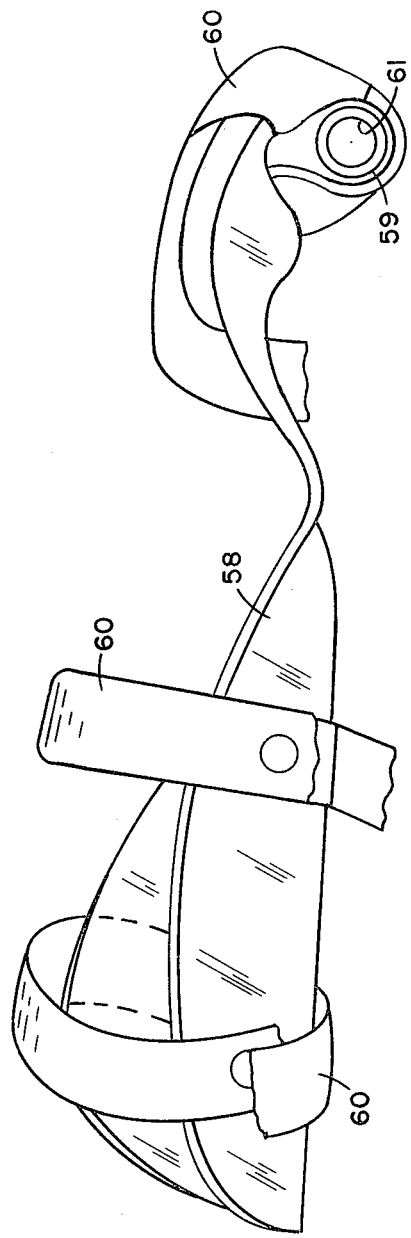

FISHING ROD CASTING DEVICE FOR A DISABLED PERSON

BACKGROUND OF THE INVENTION

1. Field of the Invention

The invention relates to casting devices in relation to fishing rods and it deals more particularly with a casting device specifically adaptable for use by a person with a severe disability of the hands and arms. it is most particularly adaptable for use by a quadriplegic or a person having a minimal amount of strength in his usable members.

In the past, various types of devices have been provided for holding fishing rods in boats or to the sides of seating devices, or merely for use on land, enabling the fisherman to angle his fishing rod at a stable position after the bait has been cast and the rod set in position for fishing.

Most of the devices heretofore provided comprise stands for holding a rod in a fixed position or the casting devices consist of those types of apparatus which require the full use of one or both hands for the cocking of the mechanism and casting of the bait.

All of the devices heretofore known comprise a complicated mechanism which can be used for automatically casting the bait, each of which, however, require the use of considerable strength for the cocking action, involving the use of both hands, and a great degree of articulation in order to release the device such that the bait may be cast. More important, the devices heretofore provided comprise very strong spring mechanisms against which the operator must work in order to cock the device with the articulation of one or both hands, such that none of these devices are suitable for use by a quadriplegic or a person who is so severely disabled that he does not have full strength in at least one of his members.

All of the casting devices revealed in the prior art might be attachable, in some manner, to the arm of a wheelchair, but none of them disclose or suggest a means of use of this device if so attached by a person of limited strength. It can obviously be seen from a perusal of the prior art that the devices which have heretofore been provided are not in any way adapted for use by a quadriplegic.

2. Discussion of Prior Art

After competent search, no existing devices of the instant type were found, there being five references which were considered, but which do not appear to conflict with the present invention or anticipate either the apparatus or the objects and purposes for which it was designed. The prior art discloses the following United States Patents:

| | |
|---|---|
| F. V. Phillips | 1,140,608 |
| J. J. Kozar | 2,765,568 |
| C. A. Shaffer | 3,436,858 |
| L. A. Worsham | 3,525,174 |
| R. B. Lesher | 3,559,328 |

It can be seen that the patent to Phillips discloses an apparatus comprising a stock having an extended forward portion with a pivot at 12 to which is connected a spring arm 8 which is pulled back into position and held in place by the trigger mechanism 16. Along the spring arm 8, through the guide 24 is lain the fishing line 25 which is taken up by the reel 26 mounted at one side of the barrel attached to the stock. The bait or lure lies in the curvature 15 of the spring arm 8 such that when the trigger 16 is released the spring arm is biased quickly forward to cast the bait in a forward direction.

It can readily be seen that this device is designed to be held in the hands of a person who has full use of both hands and is able to resist the spring tension in cocking the arm 8. While this device might be attached to the arm of a wheelchair there is no suggestion of any means whereby a person of limited strength could cock the arm 8 to be released by the trigger in the manner described in this patent. There is nothing in this patent which suggests the device of the instant invention.

The patent to Shaffer comprises a rod 15 having thereon a reel 19 which carries a line 16 extending through a tip loop 17 at the outer end of the rod. Also located at the outer end of the rod is a bait releasing holder 20 which has a finger grip 25a with mechanism attached to a trip line 31 extending to the rear portion of the rod. In order to operate this mechanism a person must hold the rod in his hand or the rod must be affixed to a position while with one of his hands he reaches to the outer end of the rod and grasps the finger grip 25a, and then pulls the rod with brute force back to the position shown in FIG. 1 of this patent. At that point, the finger grip is loosened and the trip line causes the release of the bait when it is extended fully allowing the same to be cast. This patent and the invention shown therein is exactly contra to the patent apparatus and the object of the present invention.

Nothing in this patent suggests in any way the device of the present invention.

The patent to L. A. Worsham discloses a self-impelled spincasting rig. The rod 12 breaks in the middle about a pivotal connection 34 and is adapted to be held in the hand with a thumb against the lever 56. The rod is broken in the middle about the pivot 34 and pulled into the position as shown in FIG. 3, the rod being thus pulled with one hand and brute force against the strength of the springs 54 and 62. When the lever 56 is pressed it releases the spin cast drag lever 26 and allows the release of the line 74, snapping the rod back into the horizontal position and allowing the bait to be cast. There is no suggestion as to how this might be mounted on a wheelchair and operated with one hand and the brute force which would be required to operate such a mechanism is directly contra to the principle disclosed in the instant invention.

The patent to Lesher discloses a line-caster attachment for a fishing rod. This is a mechanism adapted to be mounted on a casting rod without altering the rod, and where the rod must be held in one hand while the mechanism is operated with another hand. A spring steel strip member is provided with guide eyes and a tip eye for the fishing line. When the strip member is bent back it is momentarily cocked against the force of the bent rod by a novel pull string. When the angler releases the taut string the momentum imparted to the line carries the line and lure out over the water. Again, this requires a great deal of force to pull the rod back such that it doubles upon itself, requires two hands and does not have any suggestion as to how it might be mounted to a wheelchair or the operation be accomplished in pulling the rod back with such brute force as to overcome the natural tension of the rod. This invention does not in any way suggest the apparatus disclosed by the applicant.

The patent issued to J. J. Kozar is the closest analogous art which we have cited. This patent discloses a mechanical fishing line caster. However, a close examination of this patent will reveal that it could not accomplish the same desired effect in the same manner as the invention of the applicant. At the outset, the application discloses that the purpose of this invention is to cast the fishing line "as accurately if not more so, than is usually accomplished by hand casting".

In the second paragraph of the Disclosure this invention is very well characterized by the sentence which begins "A spring loaded rod whipping device is, in turn mounted on the outer end of the hand grip." This is indeed a "whipping device" and that is exactly what it would accomplish against the three strong tension springs 63, 64 and 65; whereas, in the present invention the object is not to whip the line out in casting, but rather to gently cast the line as the result of a gentle nudge by the disabled hand of the person occupying a wheelchair.

The biasing means of Kozar is a complicated device involving interlocking half circle bars 71 and 72 with corresponding intermeshing rack teeth with the latch dogs 82, a device of complicated construction which would be necessary to resist the terrible strength of the biasing springs before mentioned. This requires a trip rod or member 87, in combination with the spring loop 104 with its end 105 to form a trigger which is simultaneously operated to release the line and allow the end of the rod to whip with great force in a forward direction casting the lure.

If it was conceivable that this device might be attached to the arm of a wheelchair, there is still the problem of the use of great force to pull the rod 14 into a cocked position against the tension springs 63, 64 and 65, a force which a quadriplegic would not have in order to operate this type of device. The device of Kozar for retaining the line is operable completely separate from the rod holding device of Kozar, requiring a simultaneous release by means of actuating the trigger against the end of the loop spring 104. The apparatus of this invention would not be in any way obvious or adaptable to the use to which the instant invention is directed.

SUMMARY AND OBJECTS OF THE INVENTION

As it has been before stated, this invention relates to a casting device for a fishing rod which deals more particularly with a device specifically adaptable for use by a person with a severe disability of the hands and arms, such as a quadriplegic.

Hence a primary object of the invention is to provide a casting device for fishing which can be manipulated with the minimum of effort on the part of the user.

A salient feature in connection therewith is the provision by the instant invention of a device for such purposes which attaches directly to the side of a wheelchair, most easily accessible to the use of the operator.

Another important object of the invention is to provide a casting device with a single simple mechanism requiring the minimum amount of physical strength for operation. A salient feature in this connection is the provision in the instant invention of a mechanical casting arm calibrated in its biased position in direct proportion to the available energy for its release and activation in maximum operable mode.

A further object of the invention is to provide in connection therewith an auxiliary means for operation adaptable to the person of the operator for selective activation of the casting and reeling operation.

An important feature in this regard resides in the provision in this invention of a support and operating lever adaptable to the usable member of the operator such as to engage by articulation the casting activator and reeling mechanism of the apparatus.

While a number of devices have been provided for holding fishing rods or casting rods in the case of disabled persons the instant invention meets the necessity of providing a casting apparatus which will allow the maximum amount of participation by the user available to him. Thus, it will be apparent from the following disclosure of the apparatus of the present invention that the casting is not automatic, but is rather assisted by a spring biasing mechanism which affords the opportunity for the user to implement his own casting ability with the exact amount of aid from the biasing means which may be chosen by him through calibration.

BRIEF DESCRIPTION OF THE DRAWINGS

FIG. 3 is a partial operating view in elevation, showing the rod canted toward the viewer for better view, and showing the support member and operating lever attached to the forearm, immediately after casting or immediately before cocking in locked position.

FIG. 4 is a partial operating view in elevation, as in FIG. 3, with the rod canted off of normal position toward the viewer, to show the operating lever actuating the reel.

FIG. 5 is an exploded view of the rod holder housing, in elevation, canted toward the viewer, showing the rod in part in the cast position, to provide a view of the lock and the adjustable biasing spring mechanism.

FIG. 6 is a partial section, in reduced size, of the line clamp mechanism and holder housing, taken along the lines 6—6 of FIG. 5, as shown.

FIG. 9 is a partially perspective and diagrammatic view of the support member and operating lever, with the straps cut away, adapted to be strapped to the inside of the left forearm.

FIG. 10 is a top view of the support member of FIG. 9 to better show the construction.

DETAILED DESCRIPTION OF THE INVENTION

Figure 1:
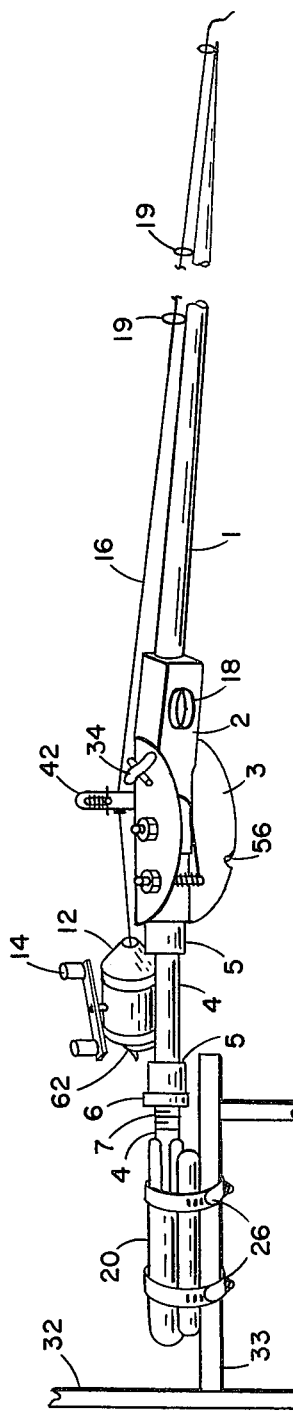
FIG. 1 is a plan view of the fishing rod casting device, slightly canted toward the viewer, showing the attachment to the arm of a diagrammatically depicted wheelchair.

Referring more particularly to the drawings, FIGS. 1 through 12 respectively, it can be seen that we have shown an embodiment of the invention wherein a fishing rod 1 is inserted in a rod holder 2 which is retained by a rod holder housing 3 attached to an adapted handle 4.

Adjustably mounted on the handle 4 are a pair of ferrules 5 which are adjustable by means of the nut 6 on the threaded portion 7 to clamp the base 10 of a spinning reel 12, as shown.

Referring more particularly to FIGS. 1, through 4 and Figs. 11 and 12, it will be seen that the handle 4 is attached to the rod holder housing 3 by means of an extended shank portion 11 received by a retaining sleeve 13 formed or welded to the top of the rod holder housing 3.

The retaining sleeve 13 is rotatably adjustable on the shank 11 by means of the set screws 25. Thus the rod holder housing 3 is rotatably adjusted on the handle 4 for purposes which will be hereinafter explained.

Referring to FIGS. 1, 2, 11 and 12, the rod 1 is adapted to be mounted on the wheelchair 32 by means of a handle holder 20 which clamps onto the arm of the chair 33 as indicated.

The proximal end of the handle 4 of the rod 1 is provided with a projecting set pin 9.

The handle holder 20 is affixed atop a base pad 24 and is provided with a bore channel 21 and a keyway 22 adapted to receive and lock the set pin 9 against the pressure of a compression spring 23. This provides a secure mounting for the handle of the rod in the handle holder 20. The handle holder 20 is then provided with a pair of metal straps 26 welded at 28 to the top of the handle holder, such straps 26 being of the type generally used to clamp a radiator hose.

Thus the straps 26 are provided with horizontal slots 27 to receive through a clamping bracket 29 the tip ends of the straps 26 which, by means of the clamp screws 30, which may be tightened, work the threaded portion of the screws 30 in the slots 27 to tighten the straps 26 securely on the arm 33 of the wheelchair 32.

Referring now to FIGS. 1, 2, 5, 6, 7 and 8, it will be seen that the rod holder housing 3 comprises a pair of arcuate side pieces welded to a top plate 31 having pivotally connected thereto, by means of the pivot pin 36, the rod holder 2 which has located forward of its rear shoulder portion a depressed locking recess 8, and attached to its forward end an operating ring 18.

The rod holder 2 is provided with a circular bore 15, adapted to receive a rod 1 and retain the same in position by means of a set screw 17.

Mounted on one side of the housing 3 is a locking lever 34 which is rotatably mounted on the rocker arm 37 by means of the rocker shaft 38. The locking lever 34 is not spring biased, but loosely mounted with sufficient restriction so that it may be alternately pushed through a hole in the housing to rest in the recess 8 in the rod holder 2 and be withdrawn therefrom by means of light pressure on the fulcrum end thereof.

Through appropriate holes in the housing 3 a retaining screw 39 mounts a winding tension spring 40 having an extended overlaying loop 41 resting on the free surface of the rod holder 2 in such manner that a tightening of the screw 39 can adjust the tension of this spring against the surface of the rod holder 2.

Figure 2:
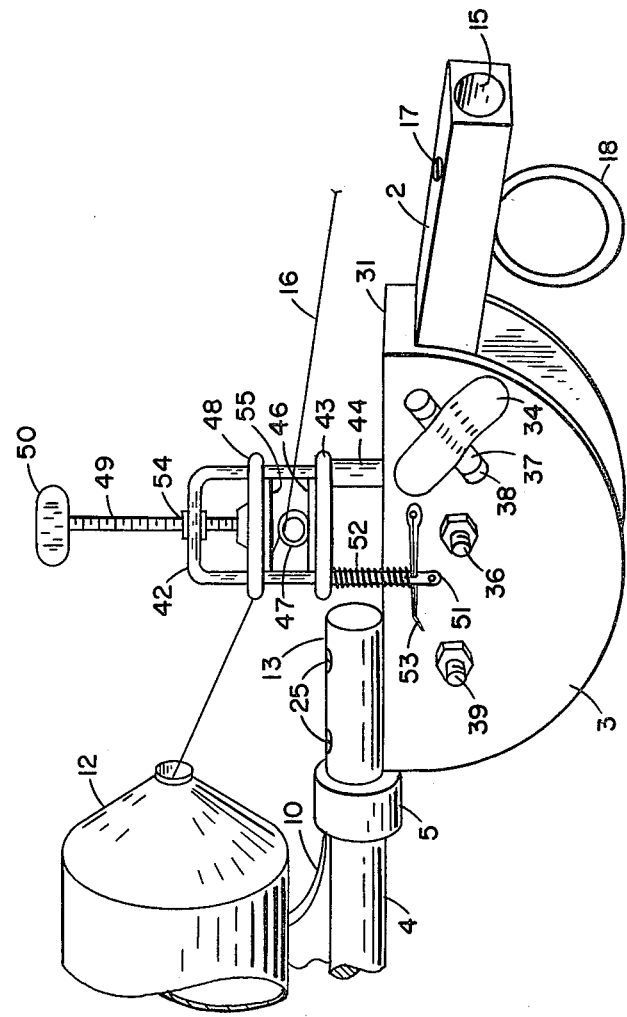
FIG. 2 is an exploded partial view, in elevation, showing the spinning reel and line, the rod holder housing showing the line clamp, the locking means and the exposed end of the adaptable holder.

Referring to FIGS. 2, 5 and 6, there is mounted on the top of the rod holder housing 3 a line guide bracket 42. The bracket 42 is slidably mounted, reciprocal vertically, through corresponding holes in a base plate 43 which is welded to a sleeve insert 44 which is affixedly fitted through a corresponding hole in the top of the rod holder housing 3 to provide a vertical bore receiving the slidable end of the bracket 42 with the lower end of the bracket resting on the top of the rod holder 2, as indicated. The opposite leg of the bracket 42 is fitted through a corresponding hole at the opposite end of base plate 43, reciprocal therein, with its lower end forming a spring guide 51 which carries a compression spring 52 held in place by means of a cotter pin 53. The spring 52 biases the bracket 42 in a normally downward direction with the lower end of the bracket through the base plate resting on the top of the rod holder 2 in the manner indicated as a camming surface. Affixed to the middle of the base plate 43 is a bridge plate 46 to the rear of which is welded a guide eye 47 to receive the fishing line 16 which is paid out from the spinning reel 12 as indicated in FIG. 1.

Juxtaposed on the bracket 42 at an adjustable distance above the bridge plate 46 is a slidable adjustable clamp 48 which has a lower plate surface 55 adapted to impinge upon the bridge plate 46 as the bracket 42 would travel in the downward position. Adjustment of the clamp 48 is made by means of a loosely journaled adjusting shaft 49, having a wing nut 50, and passing through a threaded collar 54, as shown.

Referring, again, to FIGS. 1, 2, 3 and 4, with the fishing line 16 paid off of the reel 12 through the guide eye 47, and eyelets 19 on the fishing rod 1 it can be seen that the bracket 42 may be so adjusted as to shorten the downward movement of the leg of this bracket extending through the top of the rod holder housing 3. Considering the top of the rod holder 2 as a camming surface, and observing FIGS. 7 and 8, it will be obvious that when the rod holder is turned downward in a clockwise direction the guide 42 is allowed to descend to the point where it clamps the fishing line 16 at the point of its maximum downward travel. Thusly, depending upon the length of its adjustable downward travel, the guide 42 will be caused to travel upwardly and release the fishing line 16 at different camming positions as the rod holder travels in a counterclockwise direction to achieve its normal position with the rod extended horizontally, as indicated in FIG. 1. Thus, the line guide bracket can be so adjusted as to release the fishing line at precisely the exact moment desired when the fishing rod is traveling in a counterclockwise direction during a cast. Such adjustment will depend upon the effect desired.

From the foregoing, and an observation of FIGS. 2 and 5, it will be seen that the function of the locking lever 34 is to lock the rod holder 2 in the casted position by means of the pin lock 35 resting in the recess 8.

Figure 7:
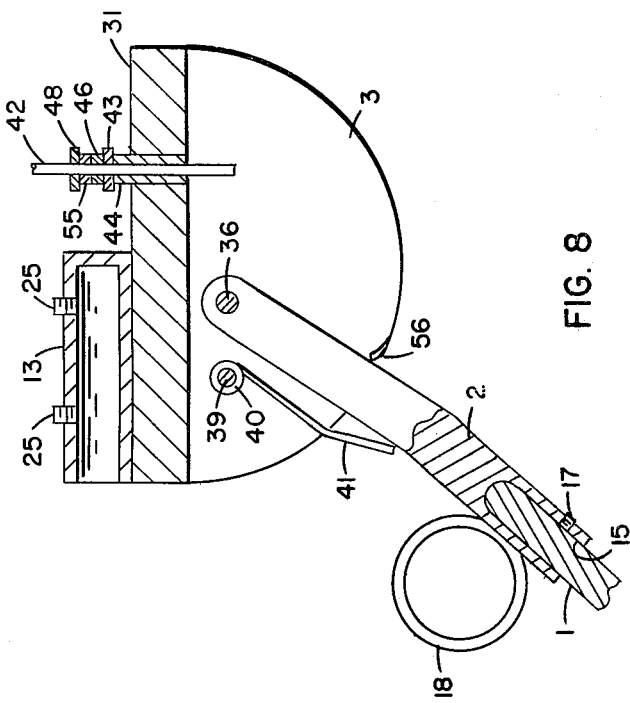
FIG. 7 is a partial section in elevation, partly cut away, of the rod holder housing and line clamp mechanism, taken through one side of said mechanism, in the rod extended mode.
Figure 8:
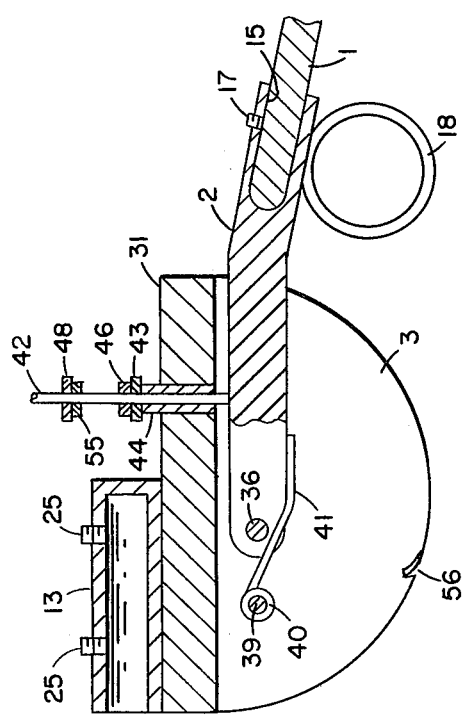
FIG. 8 is a partial section in elevation, partly cut away, of the rod holder housing and line clamp mechanism, taken through one side of said mechanism, in the rod cocked mode.
Figure 11:
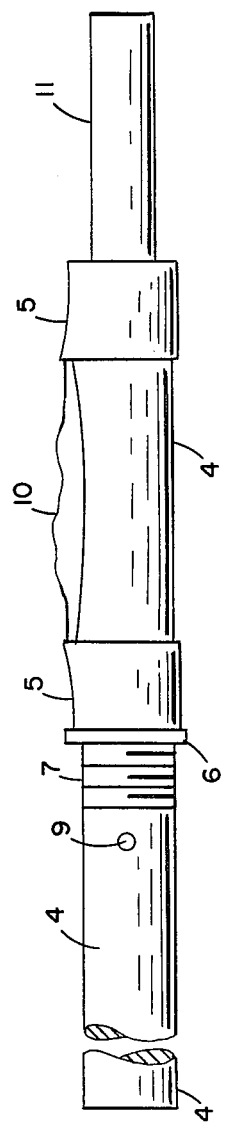
FIG. 11 is an elevation view, enlarged, of the rear rod holding member, showing the adjusting clamps to position the partial view of the base of the reel.
Figure 12:
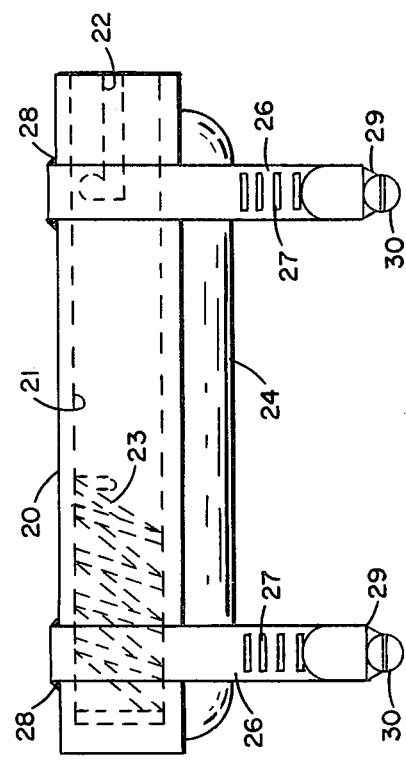
FIG. 12 is an elevation and diagrammatic view, enlarged, of the chair arm clamp housing, with the biasing spring, adapted to receive the rear rod holding member and clamp the same.

Continuing our observation of the diagrammatic views in section shown by FIGS. 7 and 8, it will now be obvious that the rod holder 2 is slightly bent such that the bore 15 holds a rod therein in such manner that when the rod holder housing is canted along its axial length away from the viewer, such position being away from the viewer, rather than as shown in Figs. 1, 3 and 4, the effect would be to hold the rod 1 in a more upward position for fishing and casting. The views of FIGS. 1, 2, 3, 4, and 5, are canted toward the viewer merely for the purpose of better showing the inside elements of the rod housing device and the operation of this device by means of the support member. Normally, in operation the entire rod mechanism would be canted along its lengthwise axis away from the viewer in order to place the rod in the proper position for casting and fishing. Hence, the rod holder housing 3 may be maintained in such position as indicated in the drawings to allow a "side cast" to be made. On the other hand, a cast is normally made in a slightly angular position off of the horizontal, as a side cast with a slightly up and over pitch. Casting positions can be selected, depending upon the agility of the fisherman, adjusted all the way to a substantially overhead cast. This is accomplished by virtue of the adjustable relationship between the handle 4 and the rod holder housing 3, wherein the handle 4 is provided with a shank portion 11 (FIG. 11) which is configurated to rotatably fit into the retaining sleeve 13 affixed to the top of the housing 3 (welded or formed on top plate 31). The shank 11 is restrained from rotating by means of the set screws 25. Thus the handle is adjustable on the rod holder housing 3 or in effect the housing 3 is adjustable on the handle 4 through the retaining sleeve 13 and set screws 25.

Referring, again, to FIGS. 1, 3, 4, 5, 7 and 8, it will be shown that the housing 3 contains on its lower plate an upturned lip 56 whose function will now be obvious.

The degree of inward projection of the lip 56 is critical, in that it is so arranged to project only a sufficient distance to engage the lower edge of the rod holder 2, against the light tension of the spring 40, when the rod holder is drawn back into the cocked position, as shown in FIG. 8.

Drawing the attention of one to FIGS. 3, 4, 9 and 10, it will be evident that the applicant has illustrated one embodiment of a support or operating member 58.

This support or operating member 58, in the embodiment shown, has been molded with the contour and configuration as indicated to fit the left forearm and hand of the operator, in the manner as indicated in FIGS. 3 and 4. This member could be made of molded plastic, light aluminum metal or other suitable material which may be formed to fit the appropriate usable member of the operator of this casting device.

In the embodiment shown support member 58 is well formed at its inner end, as shown in FIG. 10, to clasp the forearm of the operator with another configuration at its outer end so formed as to have rigidly affixed thereto an operating bar 59. The member 58 is provided with suitable "Velcro" type straps 60 (diagrammatically shown) to secure the support member 58 to the forearm and hand of the operator. The operating bar 59 is provided with an inner bore 61 adapted to receive the operating handle of the spinning reel 12.

The foregoing embodiment of the support or operating member 58 is designed to accomodate an operator who has a minimal use of the left hand and arm for pushing an object forward or pulling the same in a backward direction. It is anticipated that a support or operating member might be similarly shaped of plastic or other material to fit into the jaws clamped by the teeth of an operator who had no use of his hands or arms (but could motion his head within a limited range) in such manner that a support member of that type could have on its end an operating bar which might be used to actuate the operating ring on the rod holder to push the same forward or withdraw the same as needed. It might be anticipated that the same type of support member, with the proper configuration, might be adapted for use by one leg and ankle, if necessary in an appropriate case.

Directing our attention to FIGS. 3, 4 and 5, it will be seen that the operation of a casting device of this type is unique in that it is designed to require the minimum effort on the part of the operator. The retaining sleeve 13, as shown in FIG. 2, would be adjusted by assistance through the set screws 25, to cant the rod housing 3 away from the viewer. The spinning reel 12 would be placed on the handle 4 and tightened thereon by means of the ferrules 5 and nut 6 such as to place the operating handle knob 14 on its side as indicated in FIG. 1.

With the rod holder mechanism so attached to the left arm of a wheelchair 32, and the rod fitted with a suitable weighted casting lure, the operation would be relatively simple.

First, with the casting lure drawn in to the proper distance from the tip of the rod for a casting operation, with the rod holder drawn back into the position, as indicated in FIG. 8, held in slight tension against the spring 40, and barely impinged upon the protruding lip 56, as shown, it is obvious that with the line guide bracket 42 in the downward position as shown, the line would be clamped to prevent the lure from unreeling. Now, with the rod holder withdrawn, as in FIG. 8, the operator is ready for the casting motion.

This is accomplished by the operator first placing the operating bar 59 in the operating ring 18, as indicated in FIG. 3, but in the position as shown in FIG. 8.

Remembering that the rod holder 2 is pulled back against the slight resistance of the spring 40 and slightly impinged on the lip 56, a direct forward movement of the arm of the operator releases the rod holder. Continuing the forward movement of the arm causes the rod holder to travel in a counterclockwise direction, aided by the critically balanced tension of the spring 40 such that the minimum amount of pressure is necessary to cause the rod holder to travel fully in its direction counterclockwise to impinge against the top plate 31. Meanwhile, the end of the line guide bracket 42 has been cammed upwardly by the surface of the rod holder 2, thereby causing the bridge plate 46 to part from the surface of the lower plate 55 and release the locking effect on the fishing line 16 at precisely the right moment to cause the forward jerk on the rod 1 to cast the fishing lure out over the water.

The foregoing is not a long distance casting operation but is of sufficient length to enable a disabled person to cast his rod in such manner as to be able to lure a fish.

Once the rod 1 is in the forward position, as shown in FIG. 3, the fisherman uses the end of the operating bar 59 to press down on the forward end of the locking lever 34, causing the pin 35 to lock in the recess 8. This locks the rod in the cast position. In casting, the fisherman would have released the brake 62 prior to casting. In automatic casting reels, the brake 62 would have reset itself at the end of the cast.

For the purpose of trolling or reeling in the fishing line 16, the operator now uses the operating bar 59, which consists of a hollow bore tube in the embodiment shown, to fit over the top of the operating handle, as shown in FIG. 4. In this position the support member 58 is articulated with a rotary motion to operate the operating handle and reel in the fishing line.

Once the fishing line 16 has been reeled in, in the manner indicated above, the fisherman now uses the operating bar 59 by pressing its end on the back end of the locking lever 34, withdrawing the pin 35 from the recess 8 and through the housing 3.

With the line 16 already reeled in as indicated, and the locking lever having released the rod holder 2, the fisherman now places the operating bar 59 again in the operating ring 18, as indicated in FIG. 3, and articulates his arm to move the rod holder 2 clockwise back into the position shown in FIG. 8, wherein the rod holder is pushed slightly downward to impinge upon the lip 56 and hold the rod in the withdrawn position. It can now be seen that the lure has been withdrawn and can be unloaded of its catch by other means and made ready for re-casting. Thusly, the disabled person has cast his own rod and reeled in his own catch with the minimum of effort required. This is particularly true due to the fact that the spring 40 has been critically adjusted to provide the minimum of tension in aid of the casting movement as well as the minimum of tension resisting the withdrawal of the rod. Likewise, the line guide bracket has been adjusted by means of the wing nut 50 on the adjusting shaft 49 to clamp the line precisely at the right moment on withdrawal of the rod and to release the line precisely at the right moment on the casting operation. These two adjustments may be calibrated precisely to accomodate the specific operator and his reserve of strength.

Depending upon the degree and nature of the disability of the operator, it can readily be seen that the embodiment of the support or operating member 58 can be modified, so long as the operating bar 59 is included, such that the support member 58 might be suitably molded as an instrument to be held between the teeth of the operator where he did not have the use of either arm but was able to articulate his head and neck in such manner as to accomplish a sufficient forward and backward movement. In such case obviously the operating ring 18 could be a suitably attached yieldable projecting "lever" adapted to be received in the bore 61 of the operating bar 59 for more secure handling by the bar 59.

It should be emphasized that the embodiment of the invention illustrated is one in which the handle holder and handle are mounted on the left arm of a wheelchair. Obviously, by means of the set screws 25 on the retaining sleeve 13 the apparatus could easily be mounted on the right arm of a wheelchair. The same mechanism makes it possible to cant the rod holder and reel to the necessary degree to cause the rod to be cast or withdrawn at the proper angle to achieve a side cast or an overhead cast, to meet the necessities of the operator.

The entire mechanism is quite simple in design, can be adapted to any reel and rod extension, and requires the minimum amount of articulation and strength on the part of the operator.

Thus it will be seen that I have provided an apparatus suitably adapted to meet all of the objects and features hereinbefore set forth. From the foregoing it will be seen that the invention is well adapted to attain all of the ends and objects, together with other advantages which are obvious and which are inherent to the structure. It will be understood that certain features of any subcombinations of the invention are of utility and may be employed without reference to other features and subcombinations. This is contemplated by and is within the scope of the claims.

The present embodiment of the invention is merely illustrative, and, since many possible embodiments of the invention may be made without departing from the scope thereof, it is to be understood that all matters set forth or shown in the drawings are to be interpreted as illustrative and not in a limiting sense.

Having thus described my invention, what is claimed is:

1. A fishing rod casting device comprising, in combination:
   a handle holder having clamping means to fixedly secure the same to a wheelchair;
   means on said handle holder to receive and retain the handle of said rod;
   a rod holder housing having at its proximal end adjustable mounting means in connection with said rod handle rotatably mounting the same;
   said rod holder housing, having a pivotal connection for a rod holder, positioning selectively a rod holder in an extended cast position arcuately reciprocal in a withdrawn cocked position;
   retaining means on said rod holder adjustably securing a casting rod thereto in a casting mode;
   a crank reel affixed to the rod handle having a casting line threaded along said casting rod to a lure to be cast;
   clamping means on said rod holder housing automatically reactive to the arcuate position of said rod holder to adjustably clamp said casting line releasable at the critical cast point;
   an operating lever on said rod holder, with means for engaging an operating member manipulated by a fisherman, said lever reciprocally movable by the operator to alternately actuate said rod in an arcuate casting motion and in a withdrawn cocked position;
   adjustable spring biasing means on said rod holder housing adjustably urging said rod holder in minimal resistance assisting in actuation of the rod holder in casting mode and providing minimal resistance to actuation of the rod holder in cocking mode;
   locking means on said rod holder housing and rod holder minimally resistant to actuation by an operating member to lock said rod holder in cast or withdrawn mode;
   an operating support member having a shank preformed and shaped to affixation to the movable functioning body portion of a disabled person, and a distal end configured to engage the operating lever of said rod holder, locking means and reel actuation crank.

2. A fishing rod casting device as described in claim 1, wherein said handle holder comprises:
   an elongated housing having a bore with an angular keyway receiving a similarly configurated rod handle with a set pin biased in locked position in said keyway;
   a base pad affixed to the bottom of said housing; and
   strap means encompassing said housing and base pad adjustably securing the same to the arm of a wheel chair.

3. A fishing rod casting device as described in claim 1 wherein said adjustable mounting means of the rod holder housing and handle comprises:
   a lengthwise handle shank configurated at its distal end to be rotatably received by a rod holder housing retaining sleeve; and
   said retaining sleeve projection on said rod holder housing having a bore and set screws rotatably mounting said housing on said configurated handle shank at a desired angle for operation.

4. A fishing rod casting device as described in claim 1, wherein said retaining means on the rod holder comprises:
- an axial bore in said holder for receiving a similarly configurated rod base; and
- a set screw in said bore to rotatably secure said rod in a casting mode.

5. A fishing rod casting device as described in claim 1 wherein said clamping means for the casting line on said rod holder housing comprises:
- a base plate mounted on the outer surface of the rod holder housing, and transverse thereof, affixed at one end to a sleeve insert through the surface of said housing;
- a line guide bracket mounted lengthwise of the base plate having one leg projecting reciprocally through a bore in the outer end of said plate and the opposite leg projecting reciprocally through the sleeve insert in said holder housing in camming contact with the occlusive surface of the pivoting rod holder;
- spring biasing means on the outer leg of said guide bracket urging the inner leg of said guide bracket reciprocal in camming contact with the rod holder;
- a bridge plate mounted on said base plate supporting a fixed guide eye centrally disposed relative to said line guide bracket;
- an adjustable clamp spanning the legs of the guide bracket and receiving said legs in bores adjustable lengthwise thereof; and
- an adjusting shaft with a wing nut journaled in said adjustable clamp and screw turnable in the outer end of the guide bracket such as to allow the reciprocal adjustment of the clamp to release or clamp the fishing line at a desired point in the camming action of said guide bracket.

6. A fishing rod casting device as described in claim 1 wherein said operating lever on the rod holder comprises:
- an operating ring affixed to the outer end of said rod holder pivotally receiving the end of an operating member to withdraw the holder into a cocked position and alternately to push the rod holder into casting mode with minimal biasing assistance to release and cast the fishing line.

7. A fishing rod casting device as described in claim 1, wherein said adjustable spring biasing means on the rod holder housing comprises:
- a coiled spring in winding tension axially parallel to the pivotal axis of the rod holder with a tension arm impinging in resistance to the pivotal flexion of said holder;
- the winding axis of said spring consisting of a tension nut adjustable to vary said resistance.

8. A fishing rod casting device as described in claim 1, wherein said locking means on the rod holder housing and rod holder comprises:
- an inturned lip on said holder housing so projecting into the arcuate path of said rod holder such as to catch in minimal interlocking with the edge of the rod holder in withdrawn mode; and
- a rocker arm with a pin so projecting from the outer surface of said housing therethrough such as to impinge within the housing upon the surface of the rod holder with sufficient contact to lock said holder in the cast mode.

9. A fishing rod casting device as described in claim 1, wherein said operating support member comprises:
- a formed forearm and wrist shank piece configurated to conform to the forearm and palmar surface on its body contact side;
- binding straps to secure said support shank to a forearm and wrist;
- a tubular operating bar affixed to said shank transverse the forearm axis, said bar projecting to secure itself in the operating ring of the rod holder and having a bore to receive a reel crank knob thereby to actuate the same in rotary motion.

10. A fishing rod casting device as described in claim 1, wherein said operating support member comprises:
- a formed support bar with a shank configurated to be grasped by the movable functioning body member of a disabled person;
- a tubular operating bar affixed to the distal end of said shank transverse the axis thereof;
- said operating bar projecting to secure itself to the operating lever of said rod holder and having a bore to receive a reel crank knob and actuate the same, in rotary motion.

* * * * *